(12) United States Patent
Deng et al.

(10) Patent No.: US 8,159,973 B2
(45) Date of Patent: Apr. 17, 2012

(54) ULTRA-SCALABLE SUPERCOMPUTER BASED ON MPU ARCHITECTURE

(75) Inventors: Yuefan Deng, Setauket, NY (US); Alexander Korobka, Maywood, NJ (US); Peng Zhang, Setauket, NY (US)

(73) Assignee: Shanghai Red Neurons Co., Ltd., Shanghai (CN ( * ) Notice: Subject to any disclaimer, the term of this patent is extended or adjusted under 35 U.S.C. 154(b) by 820 days.

(21) Appl. No.: 12/179,657

(22) Filed: Jul. 25, 2008

(65) Prior Publication Data

US 2009/0094436 A1    Apr. 9, 2009

(30) Foreign Application Priority Data

Jul. 26, 2007 (CN) .......................... 2007 1 0044230

(51) Int. Cl.
*H04L 12/28* (2006.01)
(52) U.S. Cl. ........................................ 370/254; 709/249
(58) Field of Classification Search .................. 370/254; 709/249
See application file for complete search history.

(56) References Cited

U.S. PATENT DOCUMENTS

| 7,844,796 | B2 * | 11/2010 | Vorbach et al. ................... 712/18 |
| 2004/0103218 | A1 * | 5/2004 | Blumrich et al. ............. 709/249 |
| 2007/0276959 | A1 * | 11/2007 | Yancey et al. ................ 709/238 |
| 2008/0003948 | A1 * | 1/2008 | Mitran ........................ 455/67.11 |
| 2009/0024829 | A1 * | 1/2009 | Deng et al. ....................... 712/12 |

* cited by examiner

*Primary Examiner* — Robert Wilson
*Assistant Examiner* — Wei Zhao
(74) *Attorney, Agent, or Firm* — Dickinson Wright PLLC

(57) ABSTRACT

The invention provides an ultra-scalable supercomputer based on MPU architecture in achieving the well-balanced performance of hundreds of TFLOPS or PFLOPS range in applications. The supercomputer system design includes the interconnect topology and its corresponding routing strategies, the communication subsystem design and implementation, the software and hardware schematic implementations. The supercomputer comprises a plurality of processing nodes powering the parallel processing and Axon nodes connecting computing nodes while implementing the external interconnections. The interconnect topology can be based on MPU architecture and the communication routing logic as required by switching logics is implemented in the FPGA chips while some modular designs for accelerating particular traffic patterns from applications and meliorating the communication overhead are able to be deployed as well.

36 Claims, 9 Drawing Sheets

ULTRA-SCALABLE SUPERCOMPUTER BASED ON MPU ARCHITECTURE

CROSS-REFERENCES TO RELATED APPLICATION

The present patent application is related to the benefit of the following co-pending China and U.S. patent applications: China patent application No. 200610029753.0, titled for "A Parallel Processing System with Self-Consistent Expandable Internal and External Networks"; China patent application No. 200610030472.7, titled for "A Self-Consistent Multi-rank Tensor Expansion Scheme and Multi-MPU Parallel Computing Systems"; China patent application No. 200710042397.0, titled for "A Mixed Torus and Hypercube Multi-rank Tensor Expansion Method"; China patent application No. 200610117704.2, titled for "Routing Strategies for Cellular Networks in MPU Architectures". The whole contents and disclosure of the abovementioned related patents are expressly incorporated by reference herein as if fully set forth herein.

FIELD OF THE INVENTION

The present invention relates generally to the field of super-computing systems and multiprocessor architectures, and more particularly to an ultra-scalable supercomputer based on MPU (Master Processing Unit) architecture.

BACKGROUND OF THE INVENTION

With the rapid increase of a single processor processing ability, to construct a high-available, high-density and ultra-scalable supercomputer faces the embarrassing bottleneck of the communication subsystem design, whose developments and innovations dramatically lags behind the computation power. To better manage the consistent balance between the communication and computation in a large-scale supercomputer while to preserve the programmability and application portability, more and more advanced interconnect topologies are put into practice such as IBM BlueGene and Cray RedStorm employing 3-D torus and Columbia QCDOC employing truncated 6-D torus. Those novel multi-dimensional mesh-based architectures with the internally developed design of the advanced interconnect intellectual properties allow systems to comprise higher processor counts and to achieve better overall performance on applications compared to the conventional systems that rely on the commodity interconnect fabrics including the external fat-tree Infiniband or Myrinet federated switch. Additionally, as observed on systems with Myrinet and Infiniband interconnects, intermittent errors on a single link may have a serious impact on the performance of the massively parallel applications by slowing down the communication due to the time required for connection recovery and data retransmission. Alternately, mesh-based network designs overcome this issue by implementing a large portion of data links as traces on the system backplanes and by aggregating several alternative connections into a single bundle attached to a single socket, thus reducing impact caused by the number of possible mechanical faults by an order of magnitude.

Further, due to the absence of the more centralized external federated switch formed by a large number of individual switches, a mesh-based supercomputer is more flexible to be expanded without losing scalability. However, a similar-scale cluster design with several thousand nodes necessarily has to contain much more external cables connecting the nodes to tens of switches that must be located tens of meters or more away from each other. Such scenario is also a serious maintenance disaster, in addition to much higher operating expenses. The fault tolerance ability of a cluster system important for achieving the sustained and reliable computing resources for large-scale realistic applications is always guaranteed at the sacrifice of more redundant switches available, thus increasing the size of external federated switches again. However, the novel mesh-based supercomputers, such as IBM BlueGene, use smart adaptive routing strategies to isolate the fault area while routing messages with existing alternative data links around fault nodes flexibly without demanding much more hardware compensation to retain the communication balance by dynamic fault-tolerant routing algorithms.

The trends of the high-performance computing (HPC) industry strongly indicate the value of the present invention in providing an ultra-scalable supercomputer based on MPU architecture. The MPU architecture is a novel multi-dimensional network topology enabling an ultra-scalable and highly coupled interconnection while, by adding Axon nodes, providing facilitating long-range and collective communications and also for connections to external networks such as the management and external file networks. Preferably, considering both high compatibility with different processor platforms and flexible adaptability with varied application acceleration units while better and stably implementing our own IP cores, we choose the reconfigurable chip as the implementation platform of the switching logic for a processing node or an Axon node.

SUMMARY OF THE INVENTION

The object of the present invention is to provide an ultra-scalable supercomputer based on MPU architecture to achieve the high-performance and sustained computing resources at the scale of TFLOPS, PFLOPS and beyond at cost, power dissipation, and footprint advantages.

Another objective of the present invention is to provide a well-balanced supercomputer between the computation and communication abilities by the novel multi-dimensional interconnect topology as described in herein incorporated, pending China patent application No. 200610029753.0 entitled "A Parallel Processing System with Self-Consistent Expandable Internal and External Networks". The said novel interconnect topology is used to achieve a network system with low network diameter and high bandwidth for the large-scale expansion.

A further object of the present invention is to provide a flexibly expandable and easily compatible supercomputer using the FPGA-based Inter-process communication Network (FIN) in achieving the ability of leveraging existing robust processor platforms for the computational functionality while focusing on the crucial internally developed interconnect topologies, in order to permit a high degree of seamless improvements with the continuing increase of the user-specific and commodity processors powering the system and to well accommodate compatibility to custom application acceleration units such as vector processing engines. Moreover, the FPGA chip for the router device can be either other reconfigurable chips or application-specific integrated circuits (ASIC) for the implementation of the system connectivity and further, a switching chip and processing cores with other supportive units such as multi-level caches and high-speed connectors can be integrated into one chip to implement a System-on-a-Chip (SoC) design.

The FIN design philosophy further enables designers, developers and end-users to adapt and upgrade the routing functions easily and flexibly. For example, as for a specific custom application, we can implement particular communication patterns in the reconfigurable chip to better balance and accelerate the program running and further, the reconfigurable chip can take over some computational loads off the local CPU subsystem without affecting other functional blocks' configurations and designs. Additionally, in a parallel computer with MPI, we can also implement and optimize basic communication routines and collective communication schemes into the routing chip to reduce the system overhead by better exploiting the intrinsic nature of the MPU-based interconnect architectures.

A further objective of the present invention is to build a multi-MPU supercomputer with a single high-density and cost-efficient processing cell as a supernode. A processing cell comprising several processing nodes and associated Axon nodes becomes a basic construction brick. Through the tensor expansion scheme described in herein incorporated, pending China patent application No. 200610030472.7 entitled "A Self-Consistent Multi-rank Tensor Expansion Scheme and Multi-MPU Parallel Computing Systems", a ultra-scalable supercomputer is expanded while preserving a short network diameter, a high bisection bandwidth and sufficient alternative data links between processors for high bandwidth and strong fault tolerance.

The preferred hardware implementation of the present invention, a supercomputer system is based on the blade chassis solution considering the footprint and maintenances. The blade chassis solution enables the high-density multi-processor computer system at low cost, low power dissipation and high availability.

A preferred supercomputer at the present invention is to incorporate multiple interconnection networks. A first network implements a point-to-point MPU-based interconnect topology while supporting such collective operations as broadcasting and All-gather communication patterns. In said MPU-based interconnect topology, each of the processing nodes situates at the center of a multi-dimensional cube made up of its neighboring processing nodes and particularly, a boundary processing node situates at the center of a virtual multi-dimensional cube made up of its realistic and imaginary neighboring processing nodes due to the cyclic property of topology while the entire interconnect topology remains consistent and unified.

A second network implements an expansion network by connecting all of the Axon nodes for performing the long-range and collective operations such as global notification and barrier operations. In a multi-dimensional MPU topology, an Axon node connects a subset of processing nodes connected as an embedding of two multi-dimensional cubes of equal size in a preferred embodiment. Herein, these processing nodes are called as the Axon node's attached processing nodes and the Axon node is called as the upstream Axon node of these processing nodes. Next, all of Axon nodes according to their logical positions connect to form another small-scale MPU interconnect topology or a mesh-based topology instead. Additionally, an Axon node also provides its attached processing nodes with connections to external networks such as the management network and the storage file system.

A third network is the Ethernet-based management network for performing the remote monitor and administration operations to the entire system. A forth network is the high-speed external storage network. A processing node can get access to the external file system with the help of its upstream Axon node through the high-speed connections.

DETAILED DESCRIPTION OF THE PREFERRED EMBODIMENT

The interconnection network topology for the ultra-scalable supercomputer of the present inversion is based on the multi-dimensional MPU architecture connecting a plurality of processing nodes and Axon nodes by multiple independent interconnection networks. Herein, MPU, Master Processing Unit, is termed as a basic processing cell comprising a subset of processing nodes with their upstream Axon nodes and wherein the subset of processing nodes logically connected as an embedding of two virtual multi-dimensional cubes of equal size. The detailed interconnect topology definitions are described in China patent application No. 200610029753.0, titled for "A Parallel Processing System with Self-Consistent Expandable Internal and External Networks".

Figure 1:
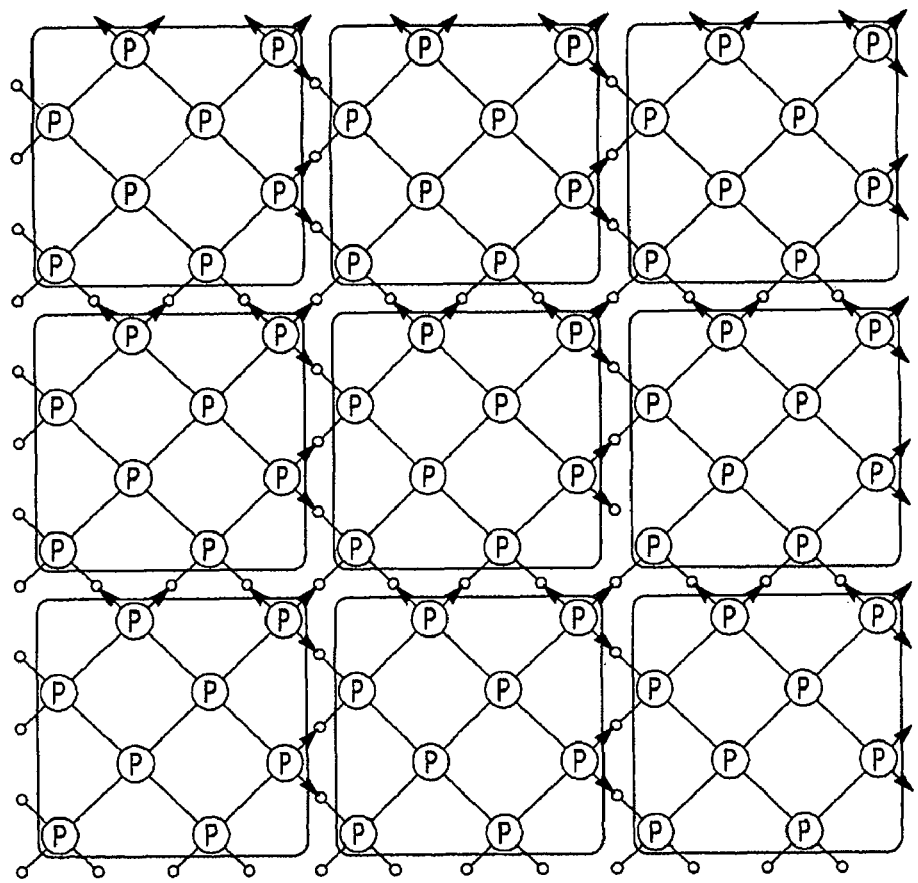
FIG. 1 schematically illustrates the 2-D MPU interconnection topology.
Figure 2:
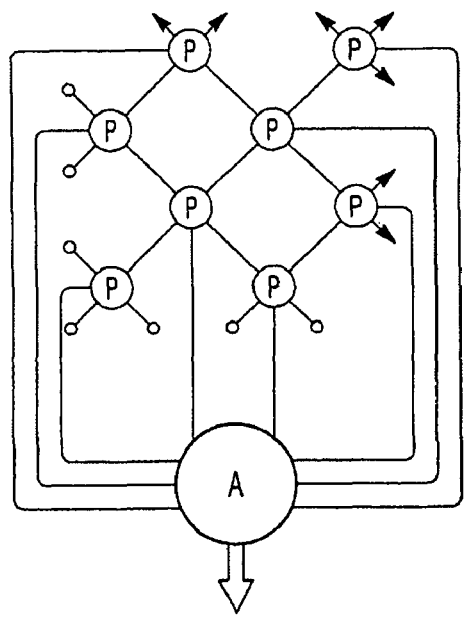
FIG. 2 schematically illustrates the internal interconnect in a 2-D MPU processing cell.

An exemplary embodiment of 2-D MPU architecture, the simplest MPU topology, is shown in FIG. 1 and wherein, every eight processing nodes compose a processing cell, logically connected as an embedding of two squares of four processing nodes and each processing node situates at the center of its four neighbors. Two neighboring processing cells are connected by the boundary processing nodes which provide the necessary interface. FIG. 2 is the internal interconnect in a 2-D MPU processing cell. As illustrated in FIG. 1, eight processing nodes compose a 2-D processing cell and one Axon node is added to connect all of eight attached processing nodes in the same cell for providing communications to external and/or expansion networks. Meanwhile, an expansion network by connecting all of Axon nodes as a two-dimensional torus is built up mainly for the long range and collective operations and moreover, provides connections to external networks.

Considering the contemporary technology and techniques, a preferred embodiment of 3-D MPU architecture is described in detail hereinafter. High-dimensional MPU architectures can be designed and implemented in a similar way with the technology progress in the manufacturing industries. Moreover, in the following descriptions, we will make use of a reconfigurable Field Programming Gate Array (FPGA) technology as the implementation platform of the switching logic for our design approach. Therefore, a FPGA-based IPC Network is termed as FIN responsible for all inter-process communications between processors in the entire system.

However, it is not only constrained to the FPGA and other programmable chips convenient for performing switching logics can be also utilized. Moreover, an Application-Specific Integrated Circuit (ASIC) chip can be developed and further a switching functional block can be embedded into a central processing subsystem to implement a SoC design, should volume reaches to a critical point.

Figure 3:
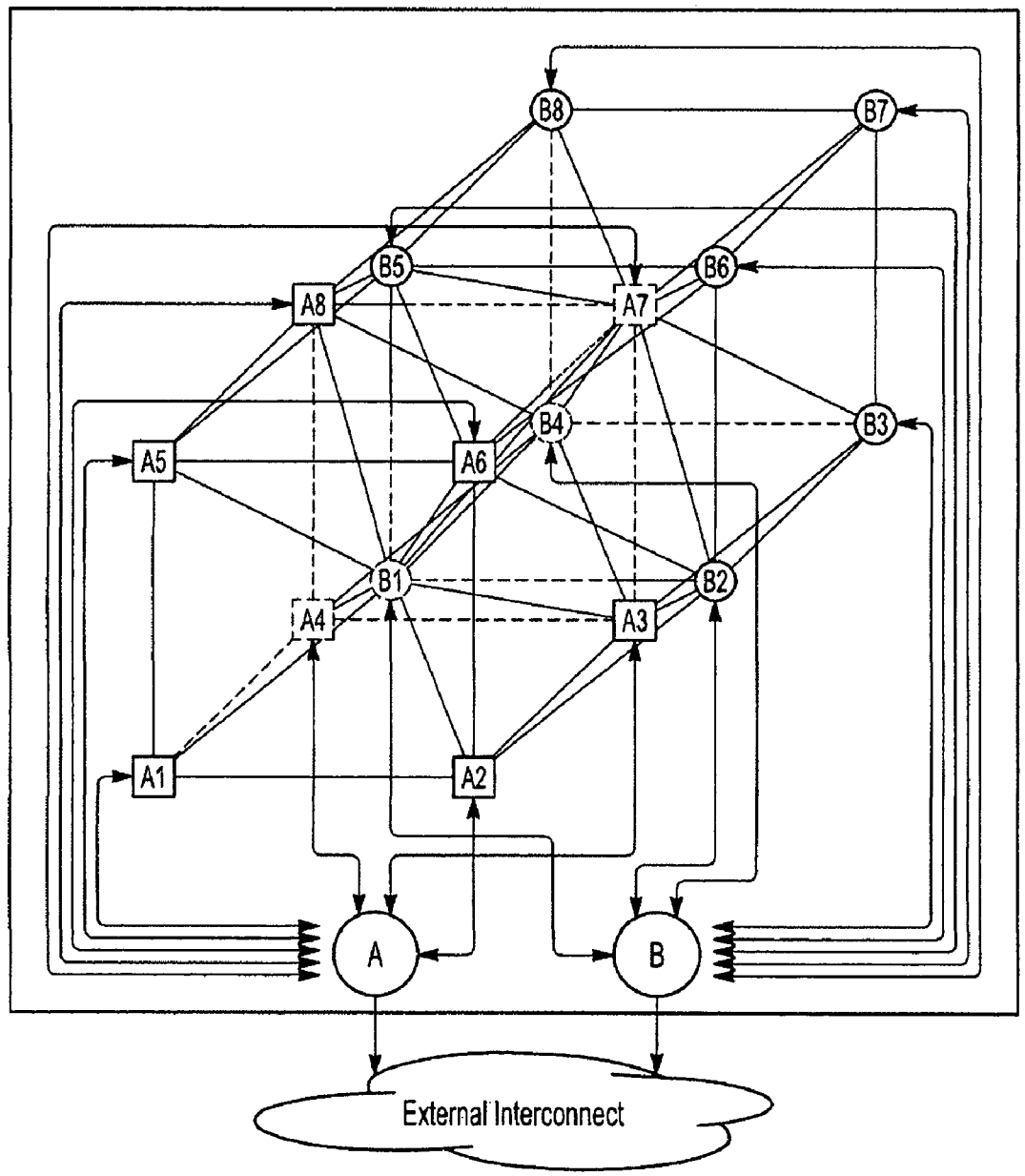
FIG. 3 schematically illustrates the internal interconnect in a 3-D MPU processing cell.

FIG. 3 is the internal interconnect in a 3-D MPU processing cell. Sixteen processing nodes compose a 3-D processing cell, logical connected as an embedding of two virtual cubes and two Axon nodes, A and B, are added to connect all of eight attached processing nodes in a virtual cube. For example, Axon node A connects to processing nodes from A1 to A8 and similarly Axon node B connects to the rest eight processing nodes in the same cell for providing communications to external and/or expansion networks.

Figure 4:
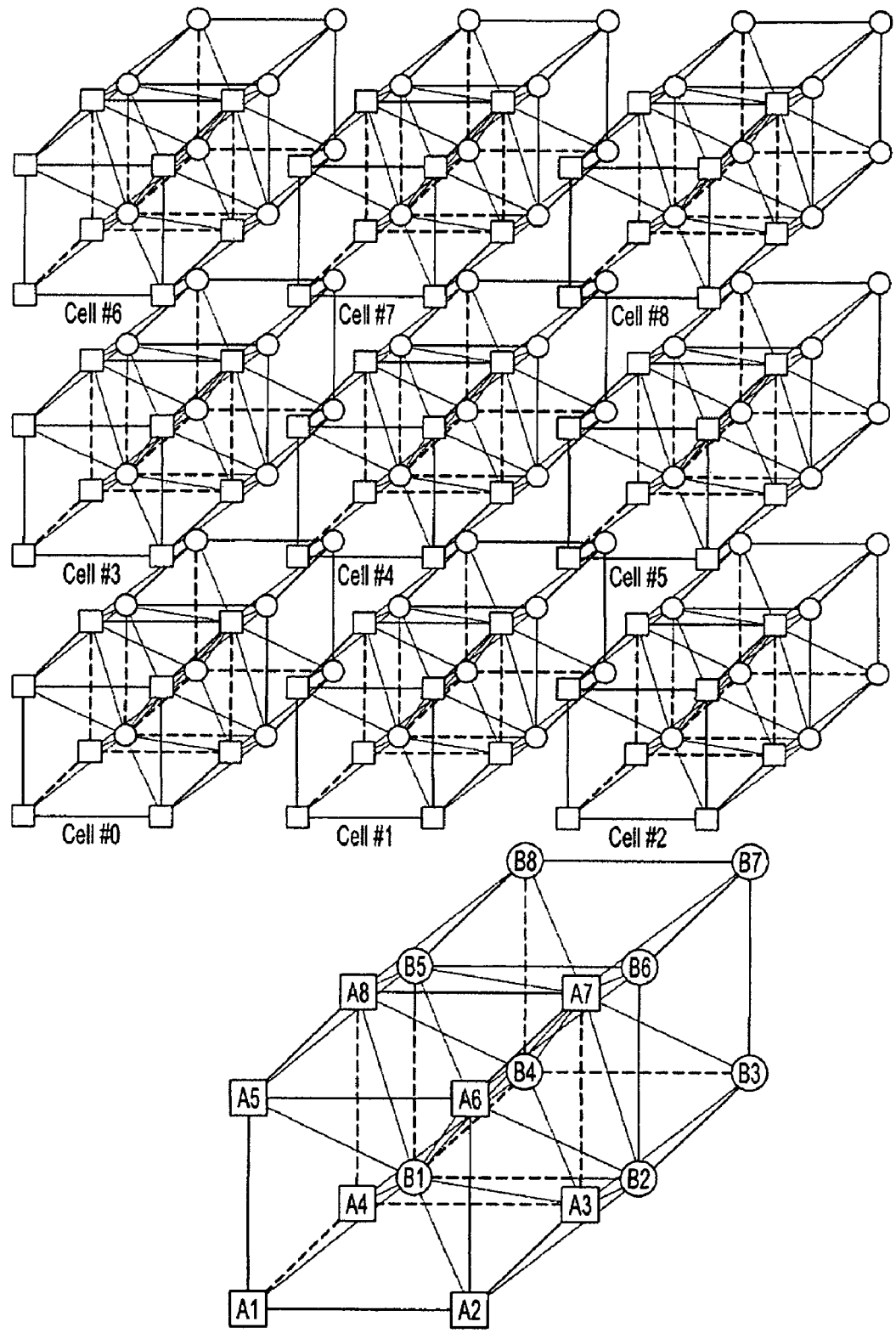
FIG. 4 schematically illustrates of the 3-D MPU interconnection topology.

In the preferred embodiment of 3-D MPU architecture, each processing node logically situates at the center of a three-dimensional cube made up of its eight neighboring processing nodes. For example in FIG. 4, the processing node B1 connects to processing nodes from A1 to A8 as a cube. Every sixteen processing nodes are connected as an embedding of two three-dimensional cubes. For example in FIG. 4, eight processing nodes from A1 to A8 form a cube and the other eight processing nodes from B1 to B8 form the other. By the cube-central connection method, those two cubes are highly coupled. A boundary processing node in a processing cell is situated at a cube made up of its internal and external processing nodes. For example, in processing cell #4, B6 connects to two internal processing nodes i.e. A6 and A7 in processing cell #4 and six external processing nodes i.e. A5 and A8 in processing cell #5, A2 and A3 in processing cell #7, and A1 and A4 in processing cell #8. As shown in the light-green portion in FIG. 4, those eight processing nodes among neighboring processing cells form a cube for B6 in processing cell #4. The other light-green portion in FIG. 4 shows the neighboring cube for B5 in processing cell #1. Therefore, a first interconnection network is built up by connecting all of the processing nodes in the entire system mainly for the point-to-point and some collective communications such as broadcasting and All-gather operations.

As described in China patent application No. 200610030472.7, titled for "A Self-Consistent Multi-rank Tensor Expansion Scheme and Multi-MPU Parallel Computing Systems", an Axon node is configured by connecting a subset of processing nodes for providing external interfaces and an expansion network is further built up by connecting all of the Axon nodes still as MPU architecture. Those processing nodes are named attached processing nodes to their Axon node and said Axon node is named the upstream Axon node to its attached processing nodes. Therefore, a second interconnection network can be built by connecting all of Axon node as MPU architecture mainly for the long-range and some collective communications such as global operations.

Additionally, a third interconnection network, defined as the management network for remote monitor and system administration, is also implemented by connecting Axon nodes to the external network such as an Ethernet switch. Herein, each processing node owns an Ethernet connection to its upstream Axon node's Ethernet switch for communication with the external management subsystem.

Additionally, a forth interconnection network, defined as the storage network for access to the external file system, is further implemented by connecting Axon nodes through high-speed channels to the external file subsystem such as Infiniband Storage Area Network (SAN). Herein, an Axon node owns expansion slots supporting Fiber or Infiniband channels to access and external file server switches and then with the upstream Axon node, the processing node can communicate with the external file subsystem.

Processing Node Overview:

A processing node provides the computation and communication ability comprising a central processing subsystem and a router device.

Figure 10:
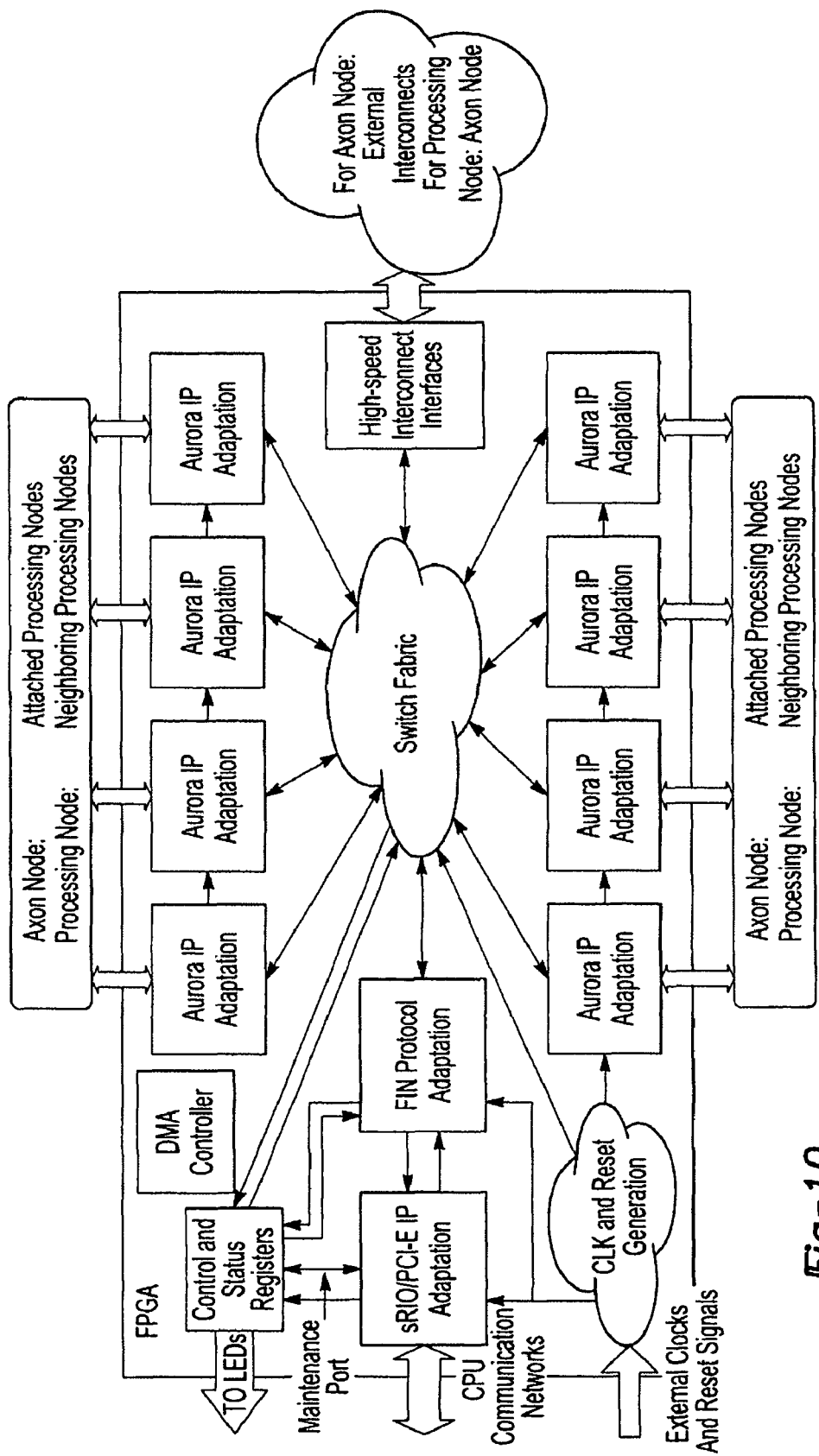
FIG. 10 schematically illustrates the functional blocks for the high-speed network logic of a generic node, either a processing node or an Axon node, based on 3-D MPU architecture.

Functional Blocks of Processing Node FPGA (PNF):

Processing Node FPGA, PNF as shown in FIG. 10, is responsible for communication among neighboring processing nodes, its upstream Axon node and local central processing subsystem. As shown in FIG. 10, a 3-D PNF commonly comprises a clock and reset module, a management module (Control and Status Registers), a sRIO/PCI-E IP adaptation module, a FIN protocol adaptation module and a switch fabric module, nine Aurora IP adaptation modules and a DMA controller, and wherein sRIO means serial RapidIO and PCI-E means Peripheral Component Interconnect Expansion. As for the functional blocks for the high-speed network logic of an Axon node, the identical functional blocks in a 3-D Axon node perform the same functions in a 3-D processing node while the Aurora IP Adaptation block in an Axon node connects to each of its attached processing nodes instead. The high-speed interconnect interfaces provide the communications for a processing cell with the external interconnects including the management network, the storage network and the expansion network.

The clock and reset module implements the functions to generate the reset and clock signals for the other modules.

The management module implements the array of system registers, handles read and write requests to the registers coming from the sRIO/PCI-E IP adaptation module, makes the contents of the registers available for the other modules that make use of their contents and collect status information from the other modules for storage in the registers, detects activity on data links and coordinates with the local processor subsystem. LEDs show status and events of interest for monitoring the state of the FPGA chip. The system registers are accessible from the local processor subsystem through maintenance requests as the module is connected to the maintenance port of the sRIO/PCI-E IP adaptation module. The array of registers includes parameters required by the switch fabric, status of Aurora links, caption of events such as temporary link errors, etc. Also, registers are used to keep track of the number of packets received/transmitted on each link, buffer fill-levels, error flags etc. The management module also generates signals for driving LEDs mounted on the PCB.

The sRIO/PCI-E IP adaptation implements the high-speed interface towards the local processor subsystem. The module separates maintenance traffic and other types of communication to different blocks; maintenance requests will result in read or write accesses to the management module and all other types of communication will be forwarded to the FIN protocol adaptation module.

The FIN protocol adaptation module wraps the original packets provided by the sRIO/PCI-E IP adaptation module in a proprietary packet format suitable for the FIN switch architecture. The proprietary packet overhead is removed when the packets are sent to the sRIO/PCI-E adaptation module for delivery to the connected local processor subsystem. The module also checks packets for errors and reports such to the management module.

Figure 11:
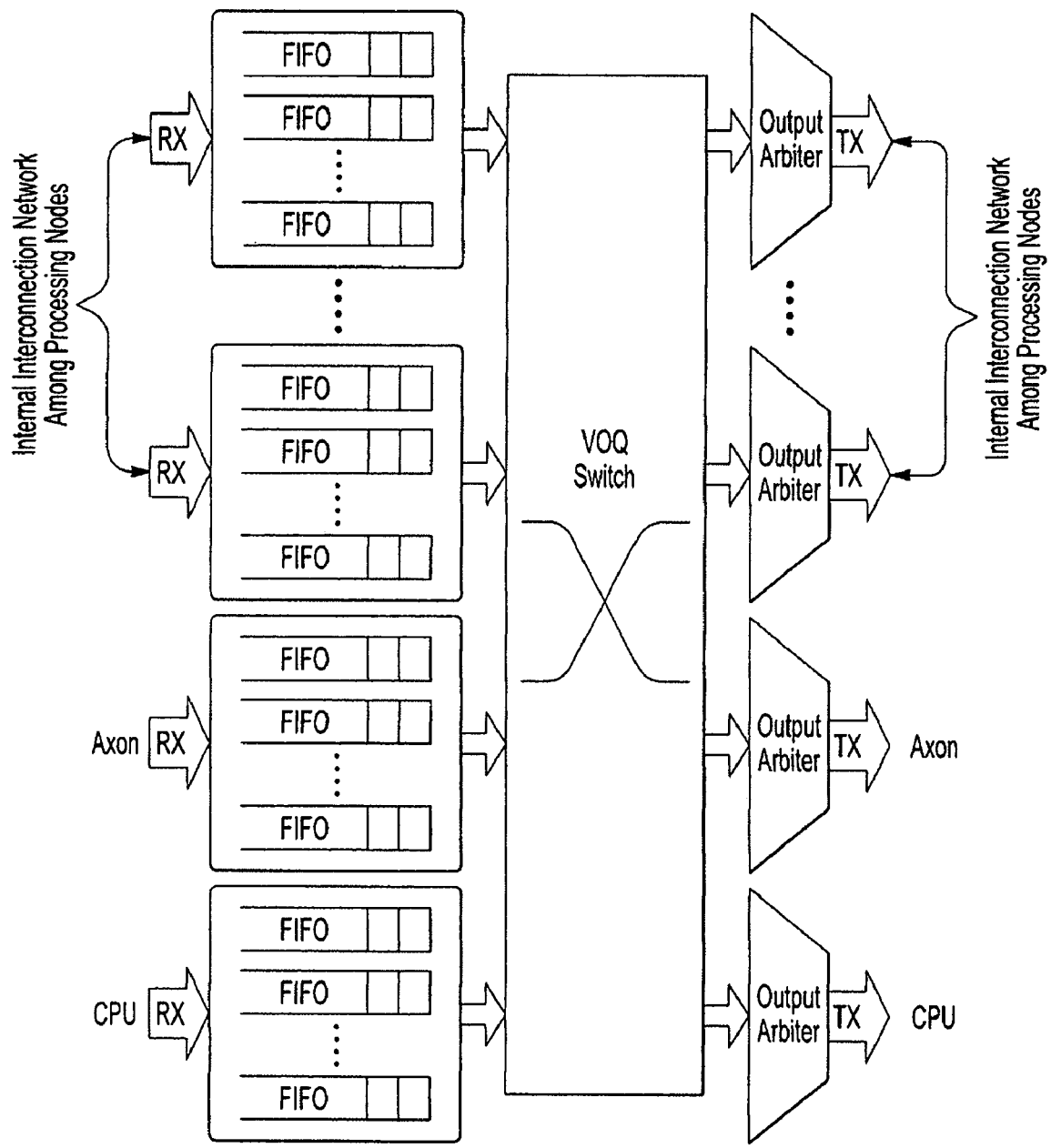
FIG. 11 schematically illustrates the virtual-output-queue switch fabric overview.

The switch fabric module handles all packet switching within FIN and requires several parameters to be operational and reports errors back to the management module. FIG. 11 is the Virtual Output Queue (VOQ) switch fabric overview. This switch module implements a Virtual Output Queue (VOQ) switch which means providing several individual buffered queues named virtual channels at the receiver and each said receiver can move data across the switch fabric to a specified transmitter according to the routing arbitration. Each said virtual channel is able to buffer one or more full-sized FIN-protocol packets at the receiver. This switch module also implements a Virtual Cut-Through (VCT) transmission mechanism which means a packet entering the switch may begin forwarding to an arbitrated downstream transmitter before all of the flits of the entire packet are stored at the receiver in order to reduce the network latency through a switch.

The Aurora IP adaptation module implements the high-speed Aurora link-layer point-to-point serial links that connect PNF with other processing nodes and also connect PNF with its upstream ANF. This module reports link status including errors to the management module as well. This module also includes the link-level flow control mechanism and the link-level retransmission mechanism to provide a stable link-level high-speed transmission platform for the other modules.

Figure 9:
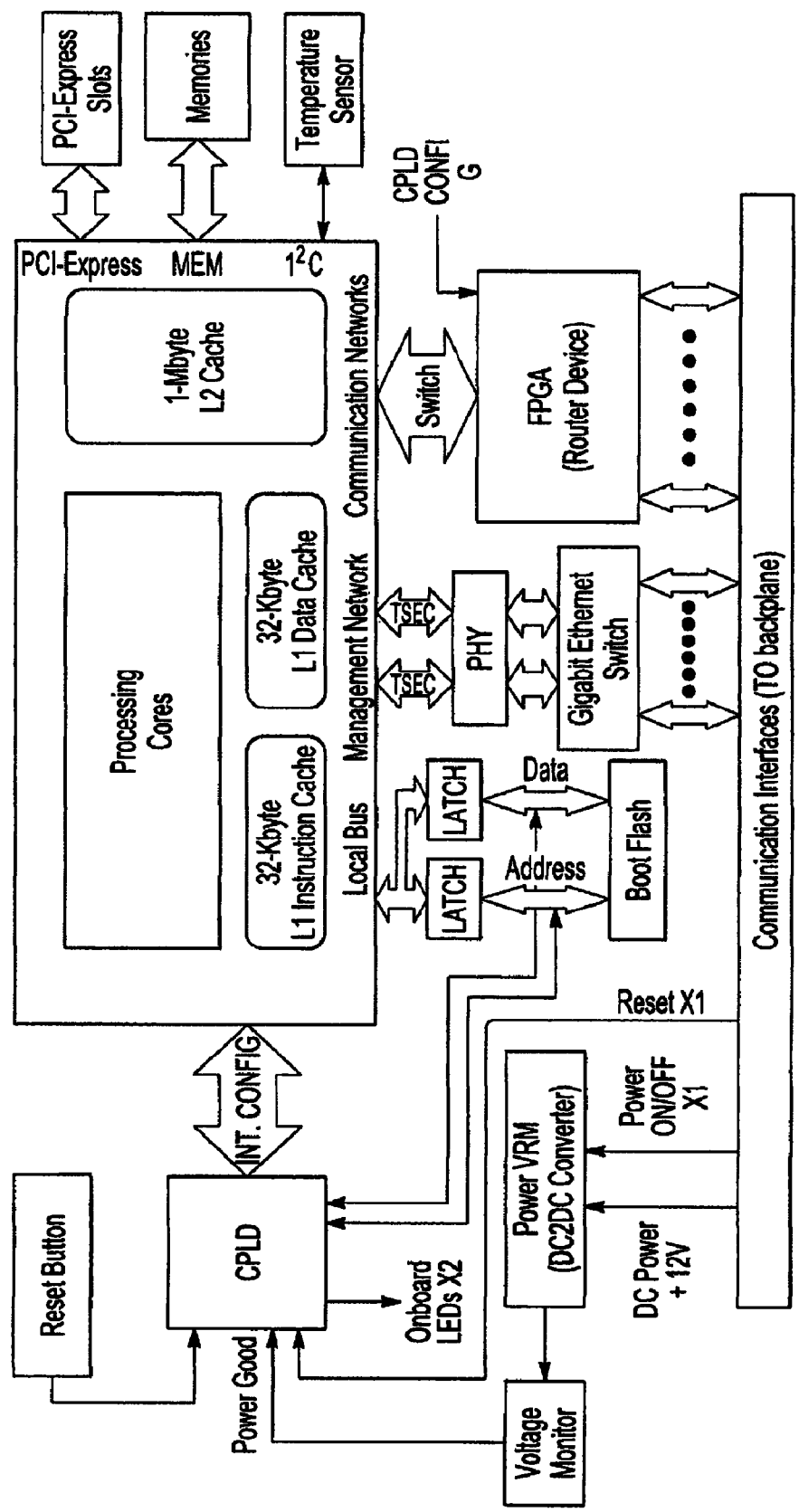
FIG. 9 schematically illustrates the block diagram of a generic node, either a processing node or an Axon node.

Block Diagram of a Processing Node:

A processing node comprises a central processor subsystem, a CPLD device, an Ethernet PHY, a FPGA-based router device and other supportive devices such as a boot flash, Power VRM, memories slots and a temperature sensor as shown in shown in FIG. 9. FIG. 9 is the block diagram of a generic node, either a processing node or an Axon node. Dark-black-marked areas are only for the block diagram of an Axon node. As for the block diagram of a processing node, a preferred processing node mainly comprises a central processing subsystem, CPLD, an Ethernet PHY for the management network, a FPGA-based router device for multiple communication networks, a power VRM, several memory slots, a boot flash and a temperature sensor. Said central processing subsystem comprises a central processing unit (CPU), one or more floating-point processing units (FPU), a local embedded multi-level cache memory and other on-chip controllers including I2C controllers, enhanced three-speed Ethernet controllers (TSEC), Double Data Rate 2 (DDR2) SDRAM memory controllers with ECC and high-speed interfaces such as Serial RapidIO interface and/or PCI-Express interface with the FPGA chip. A CPLD chip is equipped on the processing node board, able to reset and configure individual onboard components under control. A FPGA chip is equipped on the processing node board for the inter-process communication networks among all of the processing nodes in the entire MPU supercomputing architecture. A boot flash is equipped on the processing node board to store the boot code, able to be programmed in standard EPROM programmers.

As for the block diagram of an Axon node, a preferred Axon node mainly comprises a central processing subsystem, CPLD, an Ethernet PHY, an Ethernet switch as marked in red area, PCI-Express interfaces as marked in red area, a FPGA-based router device for multiple communication networks, a power VRM, several memory slots, a boot flash and a temperature sensor. The same devices as in the processing node hold the similar functions in the Axon node. Said Ethernet switch connects the Ethernet connections from all of its attached processing nodes for the management network. One or more PCI-Express slots are provided for the external networks. Optionally, one or more PCI-Express expansion cards (Fiber channel or Infiniband) can be inserted into the PCI-Express slots. A FPGA chip is equipped on the Axon node board for the communications between attached processing nodes and external networks including the management network, the storage network and the expansion network for the long-range and collective operations.

Axon Node:

An Axon node is an expansion node to strengthen the communication and management ability comprising both internal interfaces to attached processing nodes and expansion interfaces to other Axon nodes' router chips and external supportive networks. As described in the patent entitled "A Self-Consistent Multi-rank Tensor Expansion Scheme and Multi-MPU Parallel Computing Systems", an Axon node directly connected to attached processing nodes can be seen as the first-level or one-rank Axon node in the multi-rank tensor expansion scheme while providing interfaces to other one-rank Axon nodes and consequently the expansion network by connecting all of said one-rank Axon nodes as a MPU interconnect topology is defined as the one-rank expansion network to facilitate the long-range communications. Next, a two-rank Axon node further directly connects to a subset of one-rank Axon nodes at the similar manner for providing interfaces to other two-rank Axon nodes. The said subset of one-rank Axon nodes logically forms an embedding of two multi-dimensional cubes of equal size. Also, a two-rank Axon node can share most of functional blocks with a one-rank Axon node at design and implementation. Therefore, another expansion network by connecting all of said two-rank Axon nodes as another MPU interconnect topology is defined as the two-rank expansion network to further reduce the network diameter. Iteratively, a multi-rank tensor expansion network subsystem can be constructed to improve the performance of the global operations. Since the multi-rank expansion scheme is the same as that of the one-rank expansion network, the descriptions hereinafter concentrate on the implementation of the one-rank expansion network or the expansion network for short.

Functional Blocks of Axon Node FPGA (ANF):

Axon Node FPGA, ANF as shown in FIG. 10, is responsible for communication among attached processing nodes, its local central processing subsystem and multiple external networks. As shown in FIG. 10, a 3-D PNF commonly comprises a clock and reset module, a management module (Control and Status Registers), a sRIO/PCI-E IP adaptation module, a FIN protocol adaptation module and a switch fabric module, eight Aurora IP adaptation modules and a DMA controller and external expansion interfaces including connectors among neighboring Axon nodes in the expansion network and optionally one or more expansion slots with the external file server network. The identical functional blocks both in PNF and ANF hold the same function and design herein.

The differences between ANF and PNF are that ANF owns external expansion interfaces to multiple external networks. In a multi-rank tensor expansion scheme, a one-rank ANF has also high-speed interfaces with its upstream two-rank ANF.

Block Diagram of an Axon Node:

An Axon node comprises a central processor subsystem, a CPLD device, an Ethernet PHY, an Ethernet switch, a FPGA-based router device, PCI-E expansion interfaces and other supporting devices such as a boot flash, Power VRM, memory slots and a temperature sensor as shown in FIG. 9. The identical functional units both in processing node and Axon node hold the same function. Optionally, one or more PCI-E expansion cards (Fiber or Infiniband channels) can be inserted added to connect to external networks such as the storage file server network.

Figure 5:
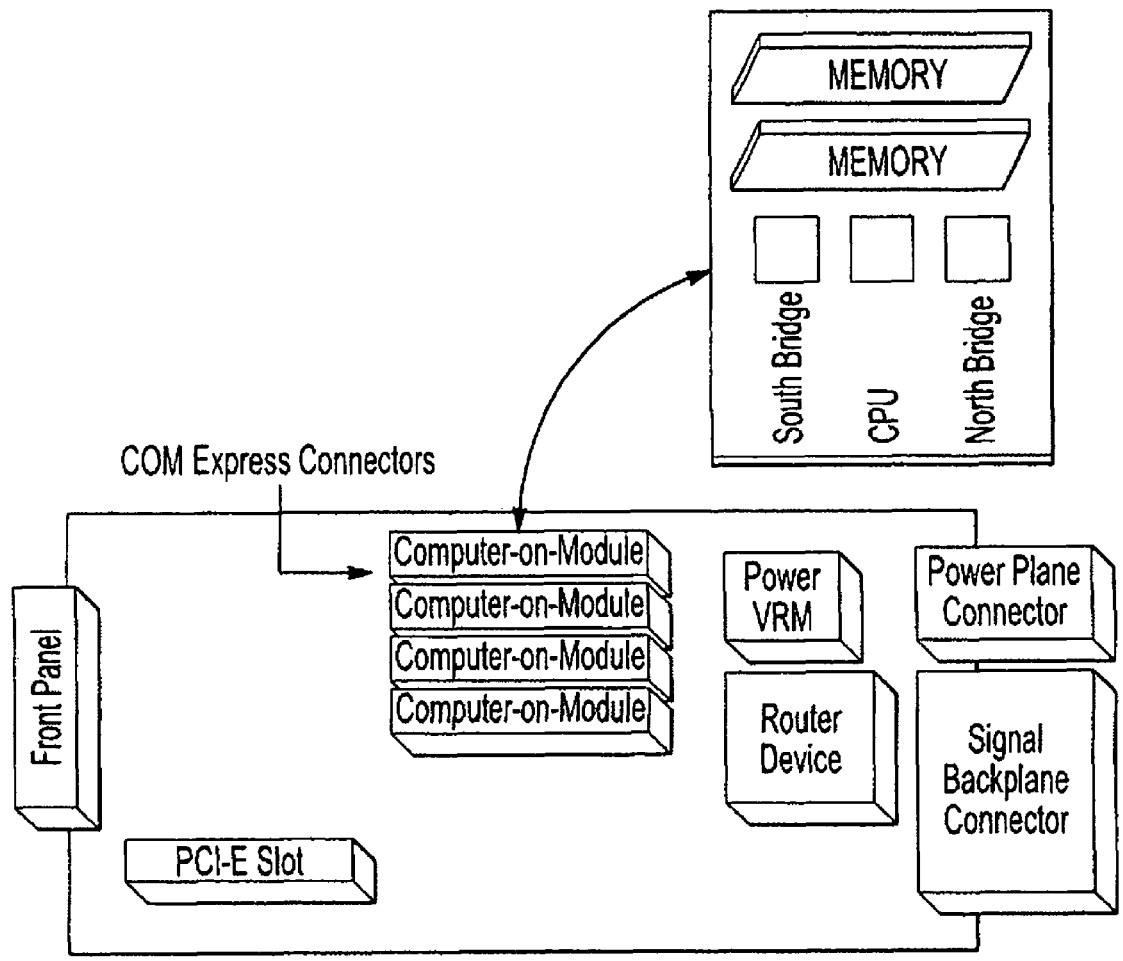
FIG. 5 schematically illustrates a generic blade layout that can host multiple generic nodes for performing the computation and communication functions.

Layout of a Generic Blade Node:

Considering the system reliability and footprint, a blade node layout hosing multiple generic nodes is illustrated in FIG. 5 and a generic node can be either processing node or Axon node. A generic blade layout can host multiple generic nodes for performing the computation and communication functions. A preferred generic node, either processing node or Axon node, is assembled on the vertically-plugged board conforming to the Extended COM (Computer-on-Module) Express specification, comprising a processing subsystem including processors, memories located on the System-on-Module board and supporting chipsets. Several such generic node boards are assembled into a blade node through those onboard COM Express connectors. On the blade layout, a power VRM module, a routing device for board-to-backplane communications and other supportive modules such as PCI-E slots are assembled as well. At the rear of the blade layout, a power connector for power supplies and a signal backplane connector for communications are located. At the front panel of the node layout, the Reset and/or Power ON/OFF buttons and LEDs are located for control and monitor.

Figure 6:
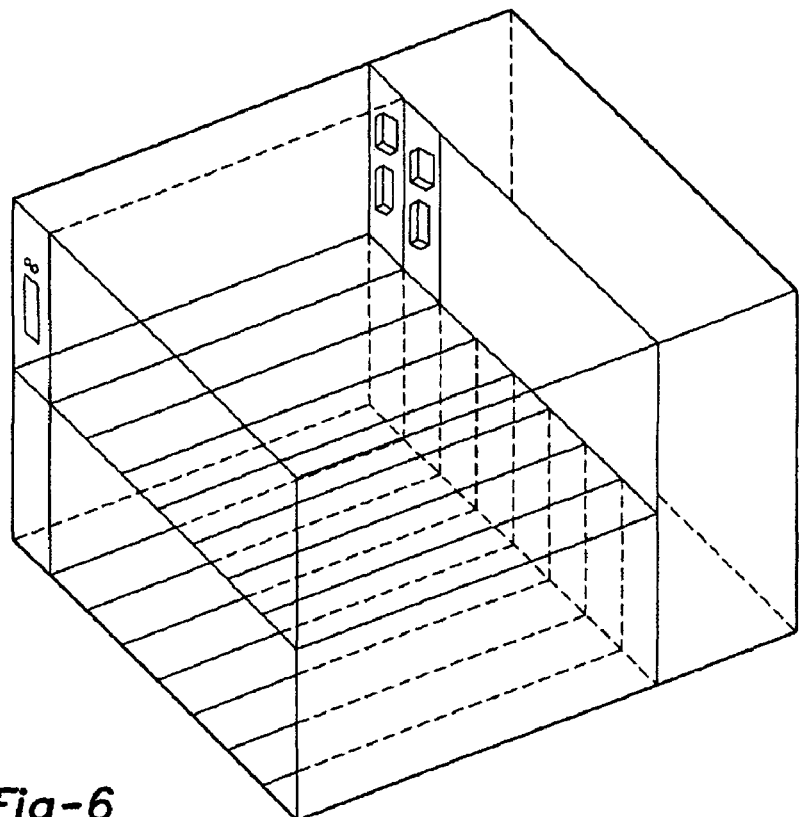
FIG. 6 schematically illustrates the internal layout of a system chassis holding up to sixteen blade slots in two layers.
Figure 7:
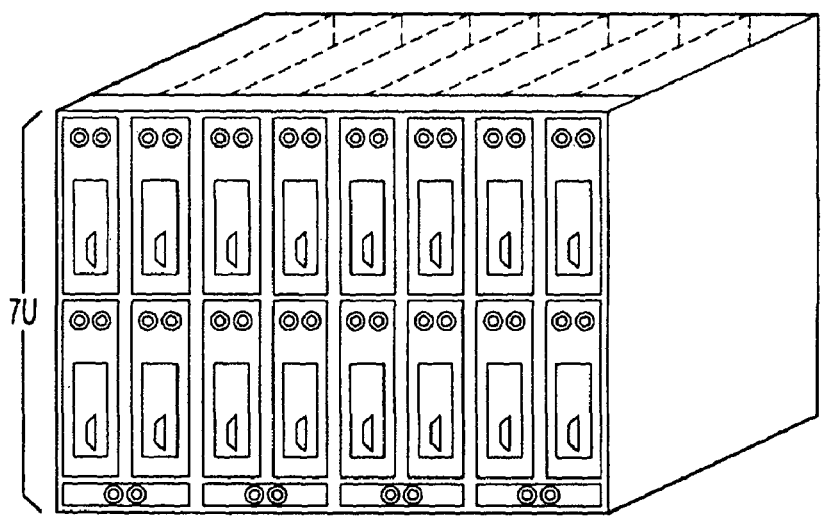
FIG. 7 schematically illustrates the front end of the system chassis configuration.

Layout of a System Chassis:

A 7U system chassis, as shown in FIG. 6 and FIG. 7, holds up to sixteen blade nodes for performing the computation and communication activities in two layers. FIG. 6 is the internal layout of a system chassis holding up to sixteen blade slots in two layers. In a chassis, all of the communications between blade slots and power supplies are implemented by the backplane. Each blade node can plug directly into the chassis backplane from the front side along the sliding rail upon insertion. The vertically mounted backplane provides a blade slot with both the power connector and the signal connector. The back of the chassis contains sockets for extending high-speed network across the chassis, Ethernet sockets for the management network and power outlets for the external power. The chassis can be removed from the rack for servicing without disrupting the configuration of other system components. FIG. 7 is the front end of the system chassis configuration. All of sixteen processing cells are located into a compute and IO chassis in two layers.

Figure 8:
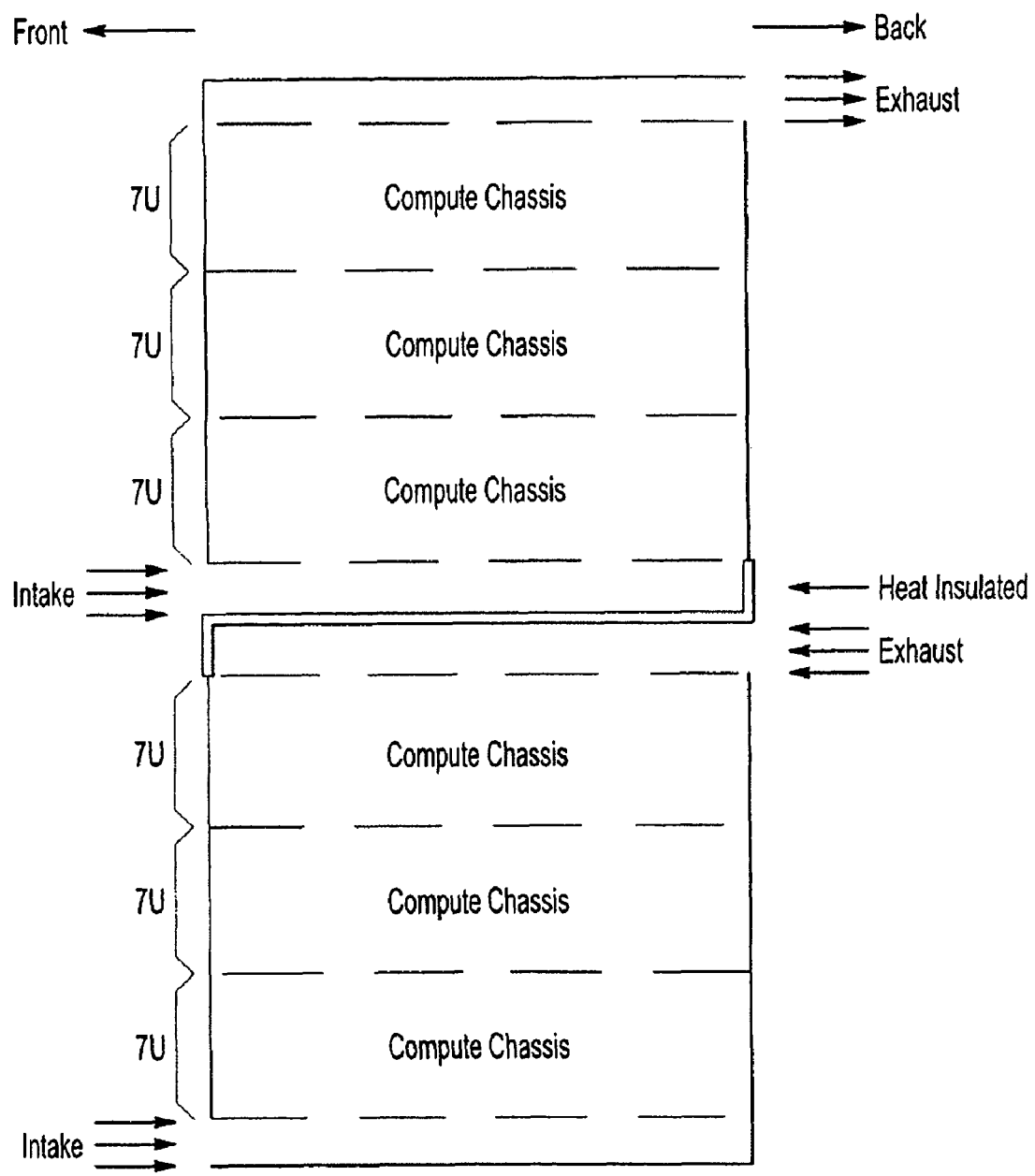
FIG. 8 schematically illustrates a fully-populated rack layout housing six system chassis or ninety-six blade nodes with supportive devices.

Layout of a System Rack:

Six 7U system chassis are populated in the standard 48U system rack with hot-swappable fan blowers on the bottom and on the top, providing the airflow for the bottom three chassis and top three chassis respectively as shown in FIG. 8. FIG. 8 is a fully-populated rack layout housing six system chassis or ninety-six blade nodes with supportive devices including hot-swappable fan blowers on the bottom and on the top respectively, providing air flows for the bottom and top three chassis respectively. The gap in the middle of the rack serves as an air vent to remove the hot air exiting the bottom stack to prevent the overheating of the chassis on top. In the absence of the power source for the chassis, each rack can house an AC/DC transformer to convert an external 230V/380V AC current into twelve independent outputs of 48V DC current for distribution to the system modules.

A Multi-MPU Supercomputer:

A multi-MPU supercomputer is a multiprocessor computing architecture comprising a plurality of MPU-based super-nodes interconnected by a multi-rank tensor expansion communication subsystem, thus featuring a self-consistent multi-rank MPU-topology scheme. The hardware embodiment of the entire supercomputer consists of a blade node directly inserted into a system chassis while multiple chassis are mounted into a standard rack with cooling and power suppliers, for high reliability and high availability with small footprint, at low cost, and low heat dissipation. Meanwhile, the hardware embodiment of a reconfigurable chip for performing communication guarantees high portability to existing parallel applications and the easy-to-update ability to keep seamlessly consistent with both the technology progress of commodity processor families and the algorithm improvement of customer applications.

Furthermore, a hybrid supercomputer can also adopt a conventional multi-dimensional torus or hypercube interconnect topology for performing the trunk communication system while increase another expansion network by adding Axon nodes through the tensor expansion scheme mainly for facilitating the long-rang operations, as described in China patent application No. 200710042397.0, titled for "A Mixed Torus and Hypercube Multi-rank Tensor Expansion Method". Herein, a MPU is a processing cell comprising a subset of processing nodes connected on the conventional multi-dimensional torus network and an Axon node connecting to those processing nodes while providing expansion interfaces to external networks. An expansion network is built up by connecting all of said Axon nodes on the multi-dimensional MPU network or the conventional multi-dimensional torus network. Moreover, these said Axon nodes can be termed as one-rank Axon nodes and another set of Axon nodes serving as two-rank Axon nodes can directly connect to one-rank Axon nodes so, similarly, a two-rank expansion network is constructed by connecting all of two-rank Axon nodes. Iteratively, a multi-rank tensor expansion communication subsystem is constructed with the aid of Axon nodes. Meanwhile, Axon nodes also provide the external connections as mentioned above. The heterogeneous system combining a torus topology and the multi-rank tensor expansion scheme is the most straightforward embodiment while sharing most of the above-mentioned exemplary embodiment. However, an ultrascalable supercomputer integrating high-dimensional MPU topology and multi-rank tensor expansion scheme is comparatively preferred.

The routing strategies in MPU architecture can use the switching functions as described in China patent application No. 200610117704.2, titled for "Routing Strategies for Cellular Networks in MPU Architectures", while enables a deadlock-free adaptive routing pattern in MPU architecture and better support the exploration of intrinsic merits of the MPU architecture.

The invention claimed is:

1. An ultra-scalable supercomputer based on Master Process Unit architecture, said ultra-scalable supercomputer comprising:

a plurality of processing and Axon nodes interconnected by multiple interconnection networks, each processing node including one or more central processing units to power computation functions and each Axon node connecting said, or a subset of, processing nodes to facilitate long-range or collective communications or connections to external subsystems or basic high-level processing or in combination of such functions;

and wherein, said multiple interconnection networks comprise four independent networking subsystems including a point-to-point Master Process Unit based network, a global mesh-based network, an external management network, an external storage network;

wherein a processing node includes a router device for the communication among neighboring processing nodes and its directly-connected Axon node; and wherein said router device for a processing node further comprises a FPGA-based Interconnect Network protocol adaptation functional block for performing the input/output operations between the switch fabric and the processing nodes' local CPUs, and the protocol adaptation layer is responsible for assembling and disassembling between the FPGA-based Interconnect Network packets and the original packets to destination CPUs without FPGA-based Interconnect Network headers or trailers while checking the packet integrity as an error detector.

2. The ultra-scalable supercomputer as claimed in claim 1, wherein a point-to-point Master Process Unit based network implements the highly-coupled embedding of two K-dimensional mesh topologies of equal size.

3. The ultra-scalable supercomputer as claimed in claim 1, wherein a first point-to-point Master Process Unit based network implements a K-dimensional interconnection topology for connecting all of said processing nodes; each of said processing nodes is situated at the center of a K-dimensional cube made up of its neighboring processing nodes while connecting to those neighbors.

4. The ultra-scalable supercomputer as claimed in claim 2, wherein each of boundary processing nodes is seen as situated at the center of a virtual K-dimensional cube made up of its real and imaginary neighboring processing nodes due to a cyclic property in topology while connecting to those neighbors.

5. The ultra-scalable supercomputer as claimed in claim 1, wherein a subset of neighboring processing nodes shares a common Axon node for multiple external communication networks and the Axon node connects to all, or a subset of, the subset of processing nodes.

6. The ultra-scalable supercomputer as claimed in claim 5, wherein a first external communication network among the multiple external communication networks is an expansion network comprising Axon nodes for long-range and collective communications and the Axon nodes are interconnected by a multi-dimensional Master Process Unit based or mesh-based topology.

7. The ultra-scalable supercomputer as claimed in claim 5, wherein a second external communication network among the multiple external communication networks is the storage network for facilitating the external storage access and all or a subset of Axon nodes interconnect to external high-speed switches to access to the file system.

8. The ultra-scalable supercomputer as claimed in claim 5, wherein a third external communication network among the multiple external communication networks is a management network for a remote access and administration system and each processing node connects to its own Axon node by the Ethernet connection and all of said Axon nodes connect to the external Ethernet switches for the remote system operations and task schedule operations.

9. The ultra-scalable supercomputer as claimed in claim 1, wherein an Axon node includes a conventional router device for the high-speed communication among its directly-connected processing nodes and neighboring Axon nodes.

10. The ultra-scalable supercomputer as claimed in claim 9, wherein said router device for an Axon node comprises a plurality of data links for connections to its attached processing nodes.

11. The ultra-scalable supercomputer as claimed in claim 10, wherein said data link can be the Aurora link-layer point-to-point serial link for moving data among several router chips.

12. The ultra-scalable supercomputer as claimed as in claim 9, wherein said router device for an Axon node further comprises the external interconnect interfaces for connections to other Axon nodes and the external file system.

13. The ultra-scalable supercomputer as claimed in claim 12, wherein said interconnect interface to other Axon nodes can be the Aurora link-layer point-to-point serial link for moving data across boards or backplanes among several Aurora router chips.

14. The ultra-scalable supercomputer as claimed in claim 12, wherein said interconnect interface to external file system can be the Infiniband interface for moving data between Axon nodes and the Double Data Rate Infiniband federated switch network.

15. The ultra-scalable supercomputer as claimed in claim 9, wherein said router device for an Axon node further comprises a Virtual Output Queue switch fabric and the Virtual Output Queue means providing several individual buffered queues named virtual channels at the receiver side and each said receiver can move data across the switch fabric to a specified transmitter where each said virtual channel can buffer one or more full-sized packets at the receiver side.

16. The ultra-scalable supercomputer as claimed in claim 9, wherein said router device for an Axon node further comprises a FPGA-based Interconnect Network protocol adaptation functional block for performing the input/output operations between the switch fabric and the Axon nodes' local CPUs, and the protocol adaptation layer is responsible for assembling and disassembling between the FPGA-based Interconnect Network packets and the original packets to destination CPUs without FPGA-based Interconnect Network headers or trailers while checking the packet integrity as an error detector.

17. The ultra-scalable supercomputer as claimed in claim 9, wherein said router device for an Axon node further comprises an adaptation functional block for moving data between its local CPUs and the FPGA-based Interconnect Network protocol adaptation functional block, and the interconnect interface between said adaptation functional block and the local processing unit can use either the Serial RapidIO or Peripheral Component Interconnect Express or Hyper-Transport protocols, and the modular design for said functional block is for flexibly supporting the varied advanced external interfaces of user-specified or general-purpose processor families.

18. The ultra-scalable supercomputer as claimed in claim 1, wherein an Axon node further includes an Ethernet switch for connections to its attached processing nodes' Ethernet interfaces to provide the remote management system with the management and other operations to each of the processing nodes and Axon nodes.

19. The ultra-scalable supercomputer as claimed in claim 1, wherein said router device for a processing node comprises a plurality of data links for connections to its neighboring processing nodes and its upstream Axon node.

20. The ultra-scalable supercomputer as claimed in claim 19, wherein said data link can be the Aurora link-layer point-to-point serial link for moving data between a couple of router chips.

21. The ultra-scalable supercomputer as claimed in claim 1, wherein said router device for a processing node further comprises a Virtual Output Queue switch fabric, and the Virtual Output Queue means providing several individual buffered queues named virtual channels at the receiver side and each said receiver can move data across the switch fabric to a specified transmitter where each said virtual channel is able to buffer one or more full-sized packets at the receiver side.

22. The ultra-scalable supercomputer as claimed in claim 1, wherein said router device for a processing node further comprises an adaptation functional block for moving data between its local CPUs and the FPGA-based Interconnect Network protocol adaptation functional block, and the interconnect interface between said adaptation functional block and the local processing units can use either serial RapidIO or Peripheral Component Interconnect Express or HyperTransport protocols, and the modular design for said functional block is for flexibly supporting the varied advanced external interfaces of user-specified or general-purpose processor families.

23. The ultra-scalable supercomputer as claimed in claim 1, wherein a processing node further includes an Ethernet adaptor for connection to its upstream Axon node's Ethernet switch to support the remote management operations on the processing node.

24. The ultra-scalable supercomputer as claimed in claim 1, wherein a second global mesh-based network implements a L-dimensional interconnection topology for connecting all of said Axon nodes; each of said Axon nodes is situated at the center of a L-dimensional cube made up of its neighboring Axon nodes while connecting to those neighbors.

25. The ultra-scalable supercomputer as claimed in claim 24, wherein each of boundary Axon nodes is seen as situated at the center of a virtual L-dimensional cube made up of its real and imaginary neighboring Axon nodes due to a cyclic property in topology while connecting to those neighbors.

26. The ultra-salable supercomputer as claimed in claim 24, wherein a second global mesh-based network implements the highly-coupled embedding of two L-dimensional mesh topologies of equal size.

27. The ultra-scalable supercomputer as claimed in claim 1, wherein a third external management network is implemented by the Ethernet network of processing nodes and Axon nodes, the Ethernet adaptor of a processing node connects to its upstream Axon node's Ethernet switch and the Ethernet interfaces of an Axon node connect to the external Ethernet switches.

28. The ultra-scalable supercomputer as claimed in claim 1, wherein a fourth external storage network is implemented by the high-speed interconnects between processing nodes and Axon nodes, the access of a processing node to the external file system is through both the connection to its upstream Axon node and the connection between said Axon node and external file servers.

29. The ultra-scalable supercomputer as claimed in claim 28, wherein the external file system can use the Double Data Rate Infiniband federated switch network.

30. The ultra-scalable supercomputer as claimed in claim 1, wherein a Master Processing Unit is a high-performance processing cell comprising a subset of neighboring processing nodes with their upstream Axon nodes and other supportive devices.

31. The ultra-scalable supercomputer as claimed in claim 30, wherein said subset of processing nodes in a Master Processing Unit processing cell best logically connected as an embedding topology of two multi-dimensional cubes of equal size.

32. The ultra-scalable supercomputer as claimed in claim 30, wherein other supportive devices include the power supply subsystem, the cooling subsystem and the onboard temperature sensors.

33. The ultra-scalable supercomputer as claimed in claim 30, wherein one or more said Master Processing Unit processing cells can be implemented in a blade slot for performing the computation and communication functions.

34. The ultra-scalable supercomputer as claimed in claim 30, wherein a system chassis configuration as a basic building block holds up to sixteen generic blade nodes while providing both the high-speed signal connectors and power connectors through the chassis backplane.

35. The ultra-scalable supercomputer as claimed in claim 30, wherein a system rack configuration houses six said system chassis with other supportive devices including the external networking, the Redundant Array of Independent Disks storage equipment, the power supply subsystem, the cooling subsystem and the management facilities.

36. The ultra-scalable supercomputer as claimed in claim 35, wherein six said system chassis in a rack are deployed as the top three chassis and the bottom three chassis respectively and the gap in the middle of said rack serves as the air vent to remove the hot air existing in the bottom stack for the prevention of the overheating of the top chassis.

* * * * *

UNITED STATES PATENT AND TRADEMARK OFFICE
CERTIFICATE OF CORRECTION

PATENT NO. : 8,159,973 B2
APPLICATION NO. : 12/179657
DATED : April 17, 2012
INVENTOR(S) : Yuefan Deng et al.

Page 1 of 1

It is certified that error appears in the above-identified patent and that said Letters Patent is hereby corrected as shown below:

In the Specification

Column 7, Line 49 "Double Data Rate 2" should not be included.
Column 7, Line 50 "FCC" should read --ECC--.

Signed and Sealed this
Sixth Day of May, 2014

Michelle K. Lee
*Deputy Director of the United States Patent and Trademark Office*